US005928783A

United States Patent [19]

Phan et al.

[11] Patent Number: 5,928,783
[45] Date of Patent: Jul. 27, 1999

[54] PRESSURE SENSITIVE ADHESIVE COMPOSITIONS

[75] Inventors: Lien Phan, Mississauga; Rajeev Farwaha; Patrick J. Hayes, both of Brampton, all of Canada

[73] Assignee: National Starch and Chemical Investment Holding Corporation, Wilmington, Del.

[21] Appl. No.: 09/036,735

[22] Filed: Mar. 9, 1998

[51] Int. Cl.[6] .............................. B32B 7/12; C08F 28/02; C08K 5/16

[52] U.S. Cl. .......................... 428/355 EN; 428/355 AC; 524/817; 524/457; 524/800; 524/801; 526/287; 427/208.4

[58] Field of Search ..................... 524/817, 457, 524/800, 801; 526/287; 428/355 EN, 355 CN, 355 AC; 427/208.4

[56] References Cited

U.S. PATENT DOCUMENTS

| | | | |
|---|---|---|---|
| 3,041,301 | 6/1962 | Armour ................................. | 260/29.3 |
| 4,077,926 | 3/1978 | Sanderson et al. .............. | 260/29.6 TA |
| 4,617,343 | 10/1986 | Walker et al. ......................... | 524/817 |
| 4,713,412 | 12/1987 | Czerepinski et al. .................. | 524/833 |
| 4,843,134 | 6/1989 | Kotnour et al. ...................... | 526/318.4 |
| 4,908,403 | 3/1990 | Spada et al. ........................... | 524/818 |
| 5,049,608 | 9/1991 | Medina .................................. | 524/375 |
| 5,122,567 | 6/1992 | Spada et al. ........................... | 524/818 |
| 5,189,126 | 2/1993 | Bernard .................................. | 526/261 |
| 5,194,550 | 3/1993 | Rance et al. ........................ | 526/318.25 |
| 5,264,532 | 11/1993 | Bernard .................................. | 526/261 |
| 5,278,227 | 1/1994 | Bernard .................................. | 524/817 |
| 5,292,842 | 3/1994 | Yang ..................................... | 526/318.4 |
| 5,317,020 | 5/1994 | Emonds-Alt et al. ................. | 514/255 |
| 5,319,020 | 6/1994 | Rosenski et al. ....................... | 524/762 |
| 5,362,816 | 11/1994 | Snyder et al. ........................ | 525/329.9 |
| 5,416,134 | 5/1995 | Skoglund ............................... | 523/201 |
| 5,420,195 | 5/1995 | Mayer et al. ........................... | 524/556 |
| 5,556,922 | 9/1996 | Mueller et al. ....................... | 525/260 |
| 5,571,617 | 11/1996 | Cooprider et al. ..................... | 428/341 |
| 5,623,011 | 4/1997 | Bernard .................................. | 524/270 |
| 5,648,166 | 7/1997 | Dunshee .......................... | 428/355 AC |
| 5,817,426 | 10/1998 | Spada et al. ........................... | 428/483 |

FOREIGN PATENT DOCUMENTS 0 573 142 A1  12/1993  European Pat. Off. ....... C09J 157/12

OTHER PUBLICATIONS

Krenceski, Johnson and Temin; "Chemical and Physical Factors Affecting Performance of Pressure–Sensitive Adhesives" Rev. Macromol. Chem. Phys., C26(1), 143–182 (1986).

*Primary Examiner*—Daniel Zirker
*Attorney, Agent, or Firm*—John D. Thallemer

[57] ABSTRACT

The invention relates to a pressure sensitive adhesive prepared from an aqueous emulsion polymer. The polymer is prepared by reacting at least one ethylenically unsaturated monomer and from about 0.1 to about 5 weight percent, based on the total weight of ethylenically unsaturated monomer, of a water-soluble or water-dispersible polymerizable surfactant having a terminal allyl amine moiety. The pressure sensitive adhesives may be used in all types of tapes, labels, decals, packaging, electrical insulation, and surgical bandaging.

28 Claims, No Drawings

PRESSURE SENSITIVE ADHESIVE COMPOSITIONS

FIELD OF THE INVENTION

This invention relates to a pressure sensitive adhesive prepared from an aqueous emulsion polymer which is the reaction product of at least one ethylenically unsaturated monomer and a polymerizable surfactant having a terminal allyl amine moiety.

BACKGROUND OF THE INVENTION

Pressure-sensitive adhesives are used in all types of tapes, labels, decals, packaging, electrical insulation, and surgical bandaging. They consist of permanently sticky or tacky polymer-based formulations usually coated onto rigid backings, which adhere spontaneously on contact with very little pressure to a variety of dissimilar surfaces without the use of solvents or heat. In some applications pressure sensitive adhesives are required to peel off easily without leaving a residue.

In recent years, more emphasis has been placed on laminating adhesives prepared from water-borne systems. These systems are generally based on acrylic-vinyl ester emulsions (latexes) which are prepared in emulsion form using conventional emulsion polymerization techniques. There are, however, problems incident to these adhesives, some of which result from the presence of residual surfactant in the compositions. In formulating conventional adhesive compositions suitable for laminating flexible films it is generally necessary to employ surfactants in at least two stages of the preparation.

Initially, surfactants are conventionally used in the emulsion polymerization as protective stabilizers for the polymerized emulsion particles. Secondly, many of the films which are commonly coated with these laminating adhesives, e.g., polyethylene, polypropylene and silicone coated release liner, are difficult to wet due to their low surfaces energies. As a result, it is generally necessary to post-add additional or other surfactant to the adhesive to facilitate wetting the film or other substrate prior to forming the laminate.

The presence of these conventional surfactants in the cured adhesive films has been found to be detrimental to the laminations for a variety of reasons. In particular, when the adhesive is to be used to form laminates wherein at least one of the surfaces is a printed surface, the presence of the surfactant often leads to discolorization or blurring of the ink. This is recognisably a problem in applications such as overlaminating of books or printed labels where the purpose of the outer surfacing film is to preserve the integrity of the printed surface. It is also known that the presence of the surfactant reduces the wet bond strength and water resistance of the laminate.

When typical levels of conventional non-ionic surfactants are used, severe water sensitivity is shown by derived films due to the hydrophilicity imparted by the surfactant and the tendency of this unbound surfactant to dissolve in water throughout the film. There is a growing trend to find alternative stabilizers such as reactive surfactants, which provide adequate colloidal stability and significant improvement in coating properties.

In order to avoid post-added surfactants, it is desirable to dilute the adhesive compositions with sufficient alcohol to provide adequate wetting. Most laminating adhesive compositions, however, do not have adequate tolerance for addition of the total quantity of alcohol required and therefore post-added surfactant or post-added surfactant plus low levels of alcohol are the most commonly employed methods of lowering their surface tension.

SUMMARY OF THE INVENTION

Accordingly, it is an object of the present invention to provide a pressure sensitive adhesive composition.

It is also an object of the invention to provide a pressure sensitive adhesive which bonds to a substrate and maintains sufficient cohesive strength.

It is another object of the invention to provide a pressure sensitive adhesive which bonds materials together and provides a water-resistant barrier between the materials.

It is a further object of the invention to provide a pressure sensitive adhesive which immediately wets the surface with which it is brought into contact.

With regard to the foregoing and other objects, the present invention provides a pressure sensitive adhesive composition comprising an aqueous emulsion polymer, said polymer comprising the reaction product of at least one ethylenically unsaturated monomer and from about 0.1 to about 5 weight percent, based on the total weight of ethylenically unsaturated monomer, of a water-soluble or water-dispersible polymerizable surfactant having a terminal allyl amine moiety, wherein the polymerization is conducted at a pH of about 2 to about 7.

According to another aspect the invention provides method of making a pressure sensitive adhesive, said method comprising (I) mixing an acidic metal salt curing agent with an aqueous emulsion polymer to form an adhesive, said polymer comprising the reaction product of at least one ethylenically unsaturated monomer and from about 0.1 to about 5 weight percent, based on the total weight of ethylenically unsaturated monomer, of a water-soluble or water-dispersible polymerizable surfactant having a terminal allyl amine moiety, wherein the polymerization is conducted at a pH of about 2 to about 7; (II) applying the adhesive to a substrate; and (III) allowing the adhesive to air cure or using radio frequency to cure the adhesive.

An additional aspect of the invention provides a tape comprising a backing coated with the pressure sensitive adhesive composition as described above.

In a preferred embodiment, the polymerizable surfactant is an allyl amine salt of alkyl benzene sulfonate having the structure

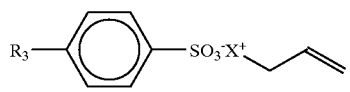

wherein $R_3$ is an alkyl group having 1 to 20 carbon atoms, and X+ is selected from the group consisting of $NH_3^+$, $NH_2R_6$, and $NR_6R_7$ wherein $R_6$ and $R_7$ are independently $C_1$–$C_4$ alkyl or hydroxyalkyl groups.

In a preferred embodiment, the polymerizable surfactant is an allyl amine salt of alkyl ether sulfate having the structure

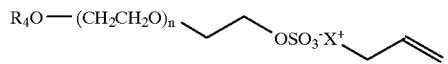

wherein $R_4$ is an alkyl group having 1 to 20 carbon atoms; n is an integer from 2 to 15; and $X^+$ is defined as above.

In a preferred embodiment, the polymerizable surfactant is an allyl amine salt of a phosphate ester having the structure

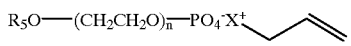

wherein $R_5$ is an alkyl group having 1 to 20 carbon atoms, and n and $X^+$ are defined as above.

The pressure sensitive adhesives may be used in all types of tapes, labels, decals, packaging, electrical insulation, and surgical bandaging. The adhesives function to keep a backing or carrier surface to which the adhesive is applied in contact with a substrate to provide the substrate with resistance to corrosion (e.g., pipe wrapping tape), protection (e.g., surgical dressing), a mounting surface (e.g., double-faced tape), a closure or connection (e.g., diaper tape, splicing tape), or identification (e.g., labels, decals, stenciling).

DESCRIPTION OF THE INVENTION

The pressure sensitive adhesive compositions of the present invention are prepared from an aqueous emulsion polymer. The polymer is prepared from the reaction product of at least one ethylenically unsaturated monomer and a polymerizable surfactant having a terminal allyl amine moiety.

The ethylenically unsaturated monomer is selected from anhydrides, vinyl esters, alpha-olefins, alkyl esters of acrylic and methacrylic acid, substituted or unsubstituted mono and dialkyl esters of unsaturated dicarboxylic acids, vinyl aromatics, unsubstituted or substituted acrylamides, cyclic monomers, monomers containing alkoxylated side chains, sulfonated monomers, and vinyl amide monomers. As used herein, "ethylenically unsaturated monomer" does not include ionic monomers. A combination of ethylenically unsaturated monomers may also be used.

Suitable anhydride monomers are, for example, maleic anhydride and itaconic anhydride. Suitable vinyl esters are, for example, vinyl acetate, vinyl formate, vinyl propionate, vinyl butyrate, vinyl isobutyrate, vinyl valerate, vinyl 2-ethyl-hexanoate, vinyl isooctanoate, vinyl nonanoate, vinyl decanoate, vinyl pivalate, and vinyl versatate. Suitable alkyl esters of acrylic and methacrylic acid are, for example, methyl acrylate, methyl methacrylate, ethyl acrylate, ethyl methacrylate, propyl acrylate, butyl acrylate, pentyl acrylate, hexyl acrylate, and 2-ethyl hexyl acrylate, etc. Suitable substituted or unsubstituted mono and dialkyl esters of unsaturated dicarboxylic acids are, for example, substituted and unsubstituted mono and dibutyl, mono and diethyl maleate esters as well as the corresponding fumarates. Suitable vinyl aromatic monomers preferably contain from 8 to 20 carbon atoms, most preferably from 8 to 14 carbon atoms. Examples of vinyl aromatic monomers are styrene, 1-vinyl naphthalene, 2-vinyl naphthalene, 3-methyl styrene, 4-propyl styrene, t-butyl styrene, 4-cyclohexyl styrene, 4-dodecyl styrene, 2-ethyl-4-benzyl styrene, 4-(phenylbutyl) styrene, 3-isopropenyl-α, α-dimethylbenzyl isocyanate, and halogenated styrenes.

Suitable acrylamide based monomers are, for example, acrylamide, N, N-dimethylacrylamide, N-octyl acrylamide, N-methylol acrylamide, dimethylaminoethylacrylate, etc. Suitable cyclic monomers are, for example, vinyl pyrrolidone, vinyl imidazolidone, vinyl pyridine, etc. Suitable sulfonated monomers are, for example, 2-acrylamido-2-methyl propane sulfonic acid, sodium methallyl sulfonate, sodium vinyl sulfonate, sulfonated sytrene, etc. Suitable vinyl amide monomers are, for example, N-vinyl formamide, N-vinyl acetamide, etc.

In a preferred embodiment of the invention, the ethylenically unsaturated monomer is an alkyl acrylate monomer having the formula:

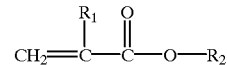

In the above formula $R_1$ is hydrogen or methyl and $R_2$ is an alkyl group having from 1 to 10 carbon atoms. The alkyl groups in the alkyl acrylate monomers can be straight chained or branched. The ethylenically unsaturated monomer is preferably selected from methyl methacrylate, butyl acrylate, styrene and combinations thereof.

Optionally, an ionic monomer may be used in addition to the ethylenically unsaturated monomer. Suitable ionic monomers include, for example, α,β-ethylenically unsaturated $C_3$–$C_8$ monocarboxylic acids, α,β-ethylenically unsaturated $C_4$–$C_8$ dicarboxylic acids, including the anhydrides thereof, and the $C_4$–$C_8$ alkyl half esters of the α,β-ethylenically unsaturated $C_4$–$C_8$ dicarboxylic acids. Preferred ionic monomers are acrylamido methyl propane, sulfonic acid, styrene sulfonate, sodium vinyl sulfonate, acrylic acid, methacrylic acid, and the $C_4$–$C_8$ alkyl half esters of maleic acid, maleic anhydride, fumaric acid, and itaconic acid. Most preferably, the ionic monomer is acrylic acid or methacrylic acid. The ionic monomer may be present in an amount of from about 0.01 to about 10 weight percent, preferably from about 0.1 to about 5 weight percent, based on the amount of ethylenically unsaturated monomer. Most preferably, the ionic monomer is present in an amount of from about 0.5 to about 3 weight percent, based on the total weight of ethylenically unsaturated monomer. A combination of ionic monomers may also be used.

The surfactant is a water-soluble or water-dispersible polymerizable surfactant having a hydrophilic and hydrophobic portion. The hydrophilic portion is selected from a sulfonate allyl amine moiety, a sulfate allyl amine moiety, and a phosphate allyl amine moiety. The hydrophobic portion is selected from either an alkyl group having 1 to 20 carbon atoms, preferably 10 to 18 carbon atoms, or a group having the structure RO—(CH$_2$CH$_2$O)n—, wherein R is an alkyl group having 1 to 20 carbon atoms, preferably 10 to 18 carbon atoms, and n is an integer from 2 to 15. The hydrophilic portion and the hydrophobic portion are connected by means of a covalent bond. Combinations of such surfactants may also be used in preparing the polymer of the invention.

A preferred polymerizable surfactant having a terminal allyl amine moiety is an allyl amine salt of alkyl benzene sulfonate denoted Structure I:

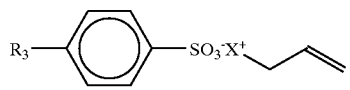

In Structure I, $R_3$ is an alkyl group having 1 to 20 carbon atoms, preferably 10 to 18 carbon atoms; and X+ is selected from $NH_3^+$, $NH_2R_6$ or $NR_6R_7$ wherein $R_6$ and $R_7$ are independently $C_1$–$C_4$ alkyl or hydroxyalkyl groups. Most preferably, the allyl amine salt of alkyl benzene sulfonate is allyl amine salt of dodecylbenzene sulfonate.

Another preferred polymerizable surfactant having a terminal allyl amine moiety is an allyl amine salt of alkyl ether sulfate denoted Structure II:

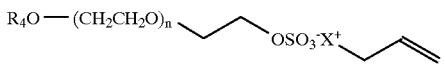

In Structure II, $R_4$ is an alkyl group having 1 to 20 carbon atoms, preferably 10 to 18 carbon atoms; n is an integer from 2 to 15, and $X^+$ is selected from $NH_3^+$, $NH_2R_6$ or $NR_6R_7$ wherein $R_6$ and $R_7$ are independently $C_1$–$C_4$ alkyl or hydroxyalkyl groups. Most preferably, the allyl amine salt of alkyl ether sulfate is allyl amine salt of laureth sulfate.

Another preferred polymerizable surfactant having a terminal allyl amine moiety is an allyl amine salt of a phosphate ester denoted Structure III:

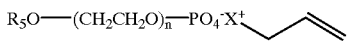

In Structure III, $R_5$ is an alkyl group having 1 to 20 carbon atoms, preferably 10 to 18 carbon atoms; n is an integer from 2 to 15, and $X^+$ is selected from $NH_3^+$, $NH_2R_6$ or $NR_6R_7$ wherein $R_6$ and $R_7$ are independently $C_1$–$C_4$ alkyl or hydroxyalkyl groups. Most preferably, the allyl amine salt of a phosphate ester is allyl amine salt of nonyl phenol ethoxylate (9 moles EO) phosphate ester. Preferred polymerizable surfactants having terminal amine moieties are available under the trademarks POLYSTEP AU1, POLYSTEP AU7 and POLYSTEP AU9 from Stepan Company.

The polymerizable surfactant is present in the aqueous emulsion in an amount of from about 0.1 to about 5 weight percent based on the total weight of ethylenically unsaturated monomer. Preferably, the polymerizable surfactant is present in an amount of from about 0.5 to about 3 weight percent based on the total weight of ethylenically unsaturated monomer in the aqueous emulsion.

The aqueous emulsion may also include one or more surfactants or emulsifiers which are not polymerizable such as anionic and/or nonionic surfactants. Anionic surfactants include, for example, from $C_8$ to $C_{12}$ alkylbenzenesulfonates, from $C_{12}$ to $C_{16}$ alkanesulfonates, from $C_{12}$ to $C_{16}$ alkylsulfates, from $C_{12}$ to $C_{16}$ alkylsulfosuccinates or from $C_{12}$ to $C_{16}$ sulfated ethoxylated alkanols. Nonionic surfactants include, for example, from $C_6$ to $C_{12}$ alkylphenol ethoxylates, from $C_{12}$ to $C_{20}$ alkanol alkoxylates, and block copolymers of ethylene oxide and propylene oxide. Optionally, the end groups of polyalkylene oxides can be blocked, whereby the free OH groups of the polyalkylene oxides can be etherified, esterified, acetalized and/or aminated. Another modification consists of reacting the free OH groups of the polyalkylene oxides with isocyanates. The nonionic surfactants also include $C_4$ to $C_{18}$ alkyl glucosides as well as the alkoxylated products obtainable therefrom by alkoxylation, particularly those obtainable by reaction of alkyl glucosides with ethylene oxide.

The aqueous emulsion polymer is prepared using free radical emulsion polymerization techniques. The aqueous emulsion polymer may be prepared by emulsion polymerization methods which are known in the art and include batch or continuous monomer addition or incremental monomer addition processes. As used herein, "batch" refers to a process whereby the entire amount of monomer is added in a single charge. As used herein, "continuous monomer addition" and "incremental monomer addition" refer to a process wherein optionally a minor portion of the monomer(s) is initially charged in the reactor and the remainder of the monomer(s) is then added gradually over the course of the reaction. The entire amount of the aqueous medium with polymerization additives can be present in the polymerization vessels before introduction of the monomer(s), or alternatively a portion of it can be added continuously or incrementally during the course of the polymerization.

Essentially any type of free radical generator can be used to initiate the free radical emulsion polymerization. For example, free radical generating chemical compounds, ultraviolet light or radiation can be used. The choice of free radical generating chemical compound depends on the desired polymerization rate and final polymer properties.

Some representative examples of free radical initiators which are commonly used include the various persulfates, percarbonates, perborates, peroxides, azo compounds, and alkyl perketals. Examples of free radical initiators are potassium persulfate, ammonium persulfate, sodium persulfate, benzoyl peroxide, hydrogen peroxide, di-t-butyl peroxide, dicumyl peroxide, caproyl peroxide, 2,4-dichlorobenzoyl perooxide, decanoyl peroxide, lauryl peroxide, cumene hydroperoxide, p-menthane hydroperoxide, t-butyl hydroperoxide, acetyl acetone peroxide, diacetyl peroxydicarbonate, t-butyl peroxyacetate, t-butyl peroxymaleic acid, t-butyl peroxybenzoate, acetyl cyclohexyl sulfonyl peroxide, 2-t-butylazo-2-cyanopropane, dimethyl azodiisobuty rate, azodiisobutyronitrile, 2-t-butylazo-1-cyanocyclohexane, 1-t-amylazo-1-cyanocyclohexane, 2,2'azobis(N,N'dimethyleneisobutyramidine) dihydrochloride, 2,2'azobis(2-amidinopropane) dihydrochloride, 2,2'-azobis(N,N'-dimethyleneisobutyramidine), 4,4'-azobis(4-cyanopentanoic acid), 2,2'-azobis{2-methyl-N-[1,1-bis(hydroxymethyl)-2hydroxyethyl]propionamide}, 2,2'-azobis[2-methyl-N-(2-hydroxyethyl) propionamide], 2,2'-azobis(isobutyramide) dihydrate, 2,2-bis-(t-butylperoxy)butane, ethyl 3,3-bis(t-butylperoxy)butyrate, and 1,1-di-(t-butylperoxy) cycloyhexane. Any combination of free radical initiators may be used to prepare the polymers of the invention.

The amount of free radical initiator employed will vary with the desired molecular weight of the polymer being synthesized. Higher molecular weights are achieved by utilizing smaller quantities of the initiator and lower molecular weights are attained by employing larger quantities of the initiator. However, as a general rule from about 0.005 to about 10 weight percent, preferably from about 0.1 to about 3 weight percent, based on total weight of ethylenically unsaturated monomer, of a free radical initiator will be included in the reaction mixture.

The polymerization is preferably conducted at a temperature which is within the range of about 30° C. to about 95° C. More preferably, the polymerization is conducted at a temperature which is within the range of about 60° C. to about 85° C.

The polymerization is carried out at a pH of about 2 to about 7, preferably at a pH of about 3 to about 6. More preferably, the polymerization is conducted at a pH of from about 3.5 to about 5.5. The pH range is important in order to incorporate, by means of covalent bonding, the polymerizable surfactant onto the polymer particles during polymerization which prevents desorption of the polymerizable surfactant when shear is applied to the latex and produces a more stable latex. In order to maintain the pH range, it may be useful to work in the presence of customary buffer systems, for example, in the presence of alkali metal carbonates, alkali metal acetates, and alkali metal phosphates.

Although the solids content and viscosity of the emulsion can vary typical total solids content which is defined as the nonvolatile components of the emulsion is in the range of from about 1 to about 70 weight percent, preferably 40 to 55 weight percent, based on the total weight of the emulsion.

The emulsion polymerization is generally continued until the residual ethylenically unsaturated monomer content is below about 1%. The latex product is then allowed to cool to about room temperature, while sealed from the atmosphere. A redox scavenger may be added to the polymerization reactor prior to removing the latex in order to react any residual monomer.

The addition of an acidic, metal salt curing agent may also be desired in order to accelerate the cure of the formulated adhesive. The preferred curing agents for use herein include acidic, metal salts selected from chromic nitrate, chromic perchlorate, aluminum nitrate, aluminum chloride, and paratoluene sulfonic acid. It is noted that the inventors determined that zinc nitrate which is a commonly used acidic, metal salt curing agent in adhesives does not allow the adhesive composition of the present invention to meet CSA 0112.8-M1977 Type II cold soak test standards for non-structural glued wood products where the product is submerged in water at 21 to 24° C. for 48 hours and without drying tested for failure.

The proportion of acidic, metal salt curing agent which is added will depend on the rate of cure which is desired in the final product but a practical range has been found to be from about 0.003 to about 0.12 gram equivalents of curing agent (anhydrous basis) for each 100 grams of the polymer. Preferably, the acidic, metal salt curing agent is aluminum chloride.

If fusion aids are used in the adhesive composition, it may also be desirable to add crosslinking inhibitors to improve the storage stability of the adhesives. Crosslinking inhibitors are described in U.S. Pat. No. 4,085,074, the disclosure of which is incorporated by reference. Typical inhibitors include ammonia, alkyl amines such as triethyl amine, and alkylol amines such as triethanol amine and N-methylethanol amine. When used, such inhibitors are generally added in an amount such that the mole ratio of the inhibitor to curing agent ranges from about 0.1 to about 1.7.

The adhesive compositions of the present invention may additionally contain other additives which include pigments such as titanium oxide, extenders such as flour, i.e., walnut shell flour, dispersing agents, defoaming agents, antifreezing agents, preservatives, surfactants, sequestering agents, coalescing agents, defoaming agents, humectants, thickeners, defoamers, colorants, waxes, bactericides, fungicides, and fillers such as cellulose or glass fibers, clay, kaolin, talc, calcium carbonate and wood meal, and odor-modifying agents.

In preparing the adhesive compositions of this invention, the aqueous polymer is mixed with the additive(s). The additive(s) may be added during the polymerization, after the polymerization and prior to the addition of the curing agent, or with the addition of the curing agent.

The adhesive compositions may be applied to a wide variety of materials such as, for example, wood, cement, concrete, nonwoven or woven fabrics, aluminum or other metals, glass, ceramics, glazed or unglazed, tiles, polyvinyl chloride and polyethylene terephthalate and other plastics, plaster, stucco, roofing substrates such as asphaltic coatings, roofing felts, synthetic polymer membranes, and foamed polyurethane insulation. In addition, the adhesive compositions may be applied to previously painted, primed, undercoated, worn, or weathered substrates.

The adhesive compositions may be applied by techniques well known in the art such as by brush, roller, air-assisted spray, airless spray, direct roll coater, curtain coater, bar coater, knife coater, reverse roll and gravure coating techniques.

The following test procedures were utilized in evaluating the pressure sensitive adhesives prepared herein:

(1) Peel Testing

Peel testing is done to observe not only the mode of failure but the magnitude of mechanical forces required to bring about failure as an adhesive strip is pulled from the adherend. Failure typically occurs at interface within the adhesive layer, or a combination of both in a phenomenon known as slip-stick. In 180° peeling, in which the adhesive strip is doubled back on itself as it is removed from the test panel.

Ninety-degree peel testing or quick tack is done immediately after an adhesive strip is laid onto a test panel and allowed to stick under its own weight. In either case, peel strength is affected not only by the thickness and the modulus of both the adhesive and the backing but by the rate and angle of peel.

Peel test measures the force required to remove a pressure sensitive specimen from a panel at a specified angle and speed. Unless otherwise specified, the values for peel adhesion reported herein are values expressed as grams per inch width of coated test sheet material determined by the following procedure: A one-inch width of the coated sheet is applied to a horizontal surface of a clean, stainless steel test plate with at least five lineal inches of the coated sheet material in firm contact with the steel plate. A hard (4.5 lb.) rubber roller is used to firmly apply the strip and remove all discontinuities and entrapped air. The free end of the coated strip is then doubled back nearly touching itself so that the angle of removal of the strip from the steel plate will be 180°. The free end of the test strip (the one pulled) is attached to the adhesion tester scale (an Instron tensile tester). The test plate is then clamped in the jaws of the tensile testing machine capable of moving the plate away from the scale at a constant rate of 12 inches per minute. The scale reading result is recorded as the tape is peeled from the steel surface.

(2) Loop Tack Test

Loop tack is a measure of the force required to remove a standard adhesive coated MYLAR film loop from a standard stainless steel plate after only nominal contact of the test strip with the steel plate in the absence of significant pressure. A one by five-inch strip of one mil MYLAR film coated with the sample adhesive is formed into a loop with the adhesive side out, and the loop is applied to a stainless steel plate until the tape loop contacts 1 square inch of surface area on the plate. The loop is retracted from the plate at a rate of 12 inches per minute, and loop tack is defined as the force observed when the final portion of the adhesive strip separates from the test plate. Specifically, the steel test plate is inserted in the lower jaws of a Loop Tack tester while the upper portion of the loop is clamped in the upper jaw of the tester and is moved downward toward the test plate at a rate of 12 inches per minute. When the test loop has contacted one square inch of test plate area, the direction of travel of the upper jaw of the Loop Tack tester is reversed and set to remove the loop from the plate at a rate of 12 lineal inches per minute.

(3) Shear Testing

Cohesive strength, or the internal strength of the adhesive mass, which resists the tendency to flow or creep under an applied load, is important in the performance of pressure-sensitive adhesives. The cohesiveness at the temperature of use must be greater than the adhesiveness to prevent the mass from splitting and leaving adhesive deposits on the substrate. The retention of cohesive strength at high temperatures can also be a requisite for certain tapes, for example, masking tapes. Moreover, in all shear applications encountered in the use of strapping tapes, good cohesive strength is critical.

Because PSA's are not crystalline and are used at temperatures considerably above their glass-transition temperatures, they are capable of viscous flow and should exhibit creep. The creep, of course, would be reflected by poor performance in a shear or "holding power" test.

Shear "strength," a measurement of the cohesive strength of the adhesive, is usually determined from the length of time it takes for the strip to fall from the test panel after application of a load. Failure usually occurs cohesively. Theoretically, the experimental setup can be modeled as the shearing of a viscous fluid between two parallel plates. Monitoring distance changes with time can be used to calculate the shear viscosity. A crosslinked sample or one with a high degree of entanglement (higher viscosity) would be expected to have a higher resistance to shear than a sample with few entanglements (low viscosity). The shear test is very sensitive to increases in temperature when polymer molecules become more mobile and tend to disengage from an entanglement network more easily.

Shear strength measures the force required to pull pressure sensitive tape from a standard flat surface in a direction parallel to the surface to which it has been affixed. It is measured in terms of the time required to pull a standard area of tape from a test panel under a standard load. Each test is conducted on an adhesive coated strip applied to a standard stainless steel panel in a manner such that a one inch by one inch portion of the strip is in firm contact with the panel with one end portion of the strip being free. The steel panel, with coated strip attached, is held in a rack such that the panel forms an angle of 178° to 180° with the extended tape free end which is then tensioned by application of a force of 1000 grams applied as a hanging weight from the free end of the test strip. The elapsed time required for each test strip to separate from the test panel is recorded as shear strength.

The following nonlimiting examples illustrate further aspects of the invention.

EXAMPLE 1
Preparation of Comparative Adhesive C1

A latex was prepared using a nonpolymerizable anionic surfactant POLYSTEP B-27 according to the following formula:

| Ingredients | Grams | Concentration in pphm |
| --- | --- | --- |
| Initial water | 393 | 50.7 |
| Monomer Mixture | | |
| Water | 225.4 | 29.1 |
| POLYSTEP B-27 | 86.1 | 11.1 (3.0 pphm 100% active) |
| Methacrylic acid (MAA) | 15.5 | 2 |
| Mercaptoethanol | 0.6 | 0.077 |
| Butyl acrylate (BA) | 775.2 | 100 |
| Catalyst Solution | | |
| Water | 86 | 11.1 |
| Ammonium persulfate | 4.9 | 0.63 |

In a 3 litre vessel, equipped with a reflux condenser, addition funnels, and stirrer, the Initial charge was added to the reactor with agitation of 100 rpm. The reactor was heated to 78° C. A 62 gram portion of the Monomer Mixture and 20 grams of the Catalyst Solution were then charged to the reaction vessel and the reaction mixture was held for 20 minutes at 78° C. The remainder of the Monomer Mixture was metered into the reaction over a period of 4 hours. The Catalyst Solution was slow added to the reactor over a period of 4.5 hours. The reaction was held for 20 minutes at 78° C. Then 0.3 grams of tertiary butyl hydroperoxide in 5 grams water and 0.3 grams sodium formaldehyde sulfoxylate were added to the reactor. The pH of the dispersion latex was adjusted to 8 by the addition of 26.6% aqueous ammonium hydroxide solution.

Comparative Adhesive C1 was determined to have 0.006% coagulum, 51% solids, average particle size of 192 nm, and Brookfield viscosity of 206 cps.

EXAMPLE 2
Preparation of Comparative Adhesive C2

A latex was prepared using the procedure and formula according to Example 1, except that 3 pphm of Abex EP-120 was used instead of 3 pphm of Polystep B-27. The pH of the latex was adjusted to 8 by the addition of a 26.6% ammonium hydroxide solution as in Example 1.

Comparative Adhesive C2 was determined to have 0.005% coagulum, a particle size of 103 nm, a percent solids of 52.6, a pH of 8.3, and a Brookfield viscosity of 1040 cps.

EXAMPLE 3
Preparation of Comparative Adhesive C3

A latex was prepared using the procedure and formula according to Example 1, except that a non-seeded emulsion polymerization technique was used. Non-seeded polymerization technique means that none of the Monomer Mixture was added prior to polymerization to the reactor to form the seed. The Monomer Mixture was slowly added for a period of four hours. The pH of the latex was adjusted to 8 by the addition of a 26.6% ammonium hydroxide solution as in Example 1.

Comparative Adhesive C3 was determined to have 0.02% coagulum, a particle size of 266 nm, percent solids of 60.1, a pH of 8 and a Brookfield viscosity of 136 cps.

EXAMPLE 4
Preparation of Adhesive A1

A latex was prepared using the procedure and formula according to Example 1, except that 2 pphm of POLYSTEP AU-9 was used instead of 3 pphm of POLYSTEP B27. The pH of the latex was adjusted to 8 by the addition of a 26.6% ammonium hydroxide solution as in Example 1.

Adhesive A1 was determined to have 0.003% coagulum, a particle size of 185 nm, percent solids of 48.3, a pH of 8 and Brookfield viscosity of 113 cps.

EXAMPLE 5
Preparation of Adhesive A2

A latex was prepared using the procedure and formula according to Example 3, except that 1.4 pphm of POLYSTEP AU-9 was used instead of 3 pphm of POLYSTEP B27. The pH of the latex was adjusted to 8 by the addition of a 26.6% ammonium hydroxide solution as in Example 1.

Adhesive A3 was determined to have 0.005% coagulum, a particle size of 207 nm, percent solids of 59.3, a pH of 8, and a Brookfield viscosity of 2482.5 cps.

EXAMPLE 6

Comparative Adhesives C1 and C2 and Adhesive A1 were evaluated for shear strength, peel adhesion and loop tack.

Test strips were prepared having a backing with a one mil. thick polyethylene terephthalate (MYLAR) coating thereon. A one mil. thick coating of the adhesives was applied to the polyethylene terephthalate coating and dried for 24 hours at 73° F. and 50 percent relative humidity. The test results are summarized in Table I.

TABLE I

| Adhesive | C1 | C2 | A1 |
|---|---|---|---|
| PEEL (g/in.) | 766.8 | 854.7 | 1162 |
| SHEAR (hrs) | 0.7 | 0.4 | >7 |
| TACK (PSI) | 1.67 | 2.56 | 4 |

The test results in Table 1 show that Comparative Adhesives C1 and C2 which were prepared in Examples 1 and 2 and stabilized by anionic surfactants Polystep B-27 and ABEX EP-120 respectively, the adhesive properties (peel, shear and tack) were much poorer than that of Adhesive A1 which was stabilized by the polymerizable surfactant having a terminal allyl amine moiety.

EXAMPLE 7

Comparative Adhesive C3 and Adhesive A2 were evaluated for peel adhesion and loop tack. The test results are summarized in Table II.

TABLE II

| Adhesive | C3 | A2 |
|---|---|---|
| PEEL (g/in.) | 1173 | 1890 |
| TACK (PSI) | 2.2 | 4.09 |

The test results in Table II show that Adhesive A2 which was polymerized with a polymerizable surfactant having a terminal allyl amine moiety exhibit 60% increase in peel test as compared to Comparative Adhesive C3 which was polymerized in the presence of a conventional anionic surfactant and used a non-seeded polymerization technique wherein none of the monomer was added to the reactor prior to polymerization. In addition, Adhesive A2 exhibited significantly higher tack than Comparative Adhesive C3.

While the invention has been described with particular reference to certain embodiments thereof, it will be understood that changes and modifications may be made by those of ordinary skill within the scope and spirit of the following claims.

What is claimed is:

1. A pressure sensitive adhesive composition comprising an aqueous emulsion polymer, said polymer comprising the reaction product of at least one ethylenically unsaturated monomer and from about 0.1 to about 5 weight percent, based on the total weight of ethylenically unsaturated monomer, of a water-soluble or water-dispersible polymerizable surfactant having a terminal allyl amine moiety, wherein the polymerization is conducted at a pH of about 2 to about 7.

2. The adhesive according to claim 1 wherein the polymerizable surfactant is an allyl amine salt of alkyl benzene sulfonate having the structure

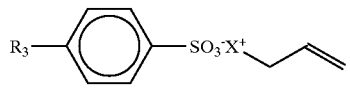

wherein $R_3$ is an alkyl group having 1 to 20 carbon atoms, and X+ is selected from the group consisting of $NH_3^+$, $NH_2R_6$ and $NR_6R_7$ wherein $R_6$ and $R_7$ are independently $C_1$–$C_4$ alkyl or hydroxyalkyl groups.

3. The adhesive according to claim 2 wherein the allyl amine salt of alkyl benzene sulfonate is allyl amine salt of dodecylbenzene sulfonate.

4. The adhesive according to claim 1 wherein the polymerizable surfactant is an allyl amine salt of alkyl ether sulfate having the structure

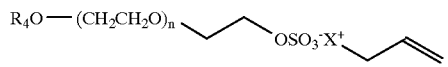

wherein $R_4$ is an alkyl group having 1 to 20 carbon atoms; n is an integer from 2 to 15; and $X^+$ is selected from the group consisting of $NH_3^+$, $NH_2R_6$ and $NR_6R_7$ wherein $R_6$ and $R_7$ are independently $C_1$–$C_4$ alkyl or hydroxyalkyl groups.

5. The adhesive according to claim 4 wherein the allyl amine salt of alkyl ether sulfate is allyl amine salt of laureth sulfate.

6. The adhesive according to claim 1 wherein the polymerizable surfactant is an allyl amine salt of a phosphate ester having the structure

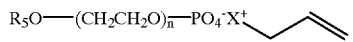

wherein $R_5$ is an alkyl group having 1 to 20 carbon atoms; n is an integer from 2 to 15; and $X^+$ is selected from the group consisting of $NH_3^+$, $NH_2R_6$ and $NR_6R_7$ wherein $R_6$ and $R_7$ are independently $C_1$–$C_4$ alkyl or hydroxyalkyl groups.

7. The adhesive according to claim 6 wherein the allyl amine salt of a phosphate ester is allyl amine salt of nonylphenol ethoxylate (9 moles EO) phosphate ester.

8. The adhesive according to claim 1 wherein the polymerizable surfactant having a terminal allyl amine moiety is present in an amount of from about 1 to about 3 weight percent based on the total weight of ethylenically unsaturated monomer.

9. The adhesive according to claim 1 wherein the ethylenically unsaturated monomer is selected from the group consisting of vinyl esters, α-olefins, anhydrides, alkyl esters of acrylic and methacrylic acid, substituted or unsubstituted mono and dialkyl esters of unsaturated dicarboxylic acids, vinyl aromatics, unsubstituted or substituted acrylamides, cyclic monomers, monomers containing alkoxylated side chains, sulfonated monomers, vinyl amide monomers, and combinations thereof.

10. The adhesive according to claim 9 wherein the vinyl esters are selected from the group consisting of vinyl acetate, vinyl formate, vinyl propionate, vinyl butyrate, vinyl isobutyrate, vinyl valerate, vinyl 2-ethyl-hexanoate, vinyl isooctanoate, vinyl nonanoate, vinyl decanoate, vinyl pivalate, and vinyl versatate.

11. The adhesive according to claim 9 wherein the alkyl esters are selected from the group consisting of methyl acrylate, methyl methacrylate, ethyl acrylate, ethyl methacrylate, propyl acrylate, butyl acrylate, pentyl acrylate, hexyl acrylate, and 2-ethyl hexyl acrylate.

12. The adhesive according to claim 9 wherein the substituted or unsubstituted mono and dialkyl esters of unsaturated dicarboxylic acids are selected from the group consisting of substituted and unsubstituted mono and dibutyl, mono and diethyl maleate esters, and the corresponding fumarates of such esters.

13. The adhesive according to claim 9 wherein the vinyl amide monomers are selected from the group consisting of N-vinyl formamide and N-vinyl acetamide.

14. The adhesive according to claim 9 wherein the vinyl aromatic monomer is selected from the group consisting of styrene, 1-vinyl naphthalene, 2-vinyl naphthalene, 3-methyl styrene, 4-propyl styrene, t-butyl styrene, 4-cyclohexyl styrene, 4-dodecyl styrene, 2-ethyl-4-benzyl styrene, and 4-(phenylbutyl) styrene.

15. The adhesive according to claim 1 wherein the ethylenically unsaturated monomer is selected from the group consisting of styrene, methyl methacrylate, butyl acrylate, and combinations thereof.

16. The adhesive according to claim 1 wherein the polymer further comprises an ionic monomer selected from the group consisting of $\alpha,\beta$-ethylenically unsaturated $C_3$–$C_8$ monocarboxylic acids, $\alpha,\beta$-ethylenically unsaturated $C_4$–$C_8$ dicarboxylic acids and the anhydrides thereof, $C_4$–$C_8$ alkyl half esters of the $\alpha,\beta$-ethylenically unsaturated $C_4$–$C_8$ dicarboxylic acids, and combinations thereof.

17. The adhesive according to claim 16 wherein the ionic monomer is selected from the group consisting of acrylamido methyl propane, sulfonic acid, styrene sulfonate, sodium vinyl sulfonate, acrylic acid, methacrylic acid, and the $C_4$–$C_8$ alkyl half esters of maleic acid, maleic anhydride, fumaric acid and itaconic acid.

18. The adhesive according to claim 17 wherein the ionic monomer is selected from the group consisting acrylic acid and methacrylic acid.

19. The adhesive according to claim 16 wherein the ionic monomer is present in an amount of from about 0.01 to about 10 weight percent, based on the total weight of ethylenically unsaturated monomer.

20. The adhesive according to claim 19 wherein the ionic monomer is present in an amount of from about 0.1 to about 5 weight percent, based on the total weight of ethylenically unsaturated monomer.

21. The adhesive according to claim 20 wherein the ionic monomer is present in an amount of from about 0.5 to about 3 weight percent, based on the total weight of ethylenically unsaturated monomer.

22. The adhesive according to claim 1 wherein the aqueous emulsion polymer is formulated with an acidic metal salt curing agent in an amount of from about 0.003 to about 0.12 gram equivalents per 100 grams of the polymer.

23. A method of making a pressure sensitive adhesive, said method comprising
(I) mixing an acidic metal salt curing agent with an aqueous emulsion polymer to form an adhesive, said polymer comprising the reaction product of at least one ethylenically unsaturated monomer and from about 0.1 to about 5 weight percent, based on the total weight of ethylenically unsaturated monomer, of a water-soluble or water-dispersible polymerizable surfactant having a terminal allyl amine moiety, wherein the polymerization is conducted at a pH of about 2 to about 7;
(II) applying the adhesive formed in Step (I) to a substrate; and
(III) allowing the adhesive to air cure or using radio frequency to cure the adhesive.

24. The method of claim 23 wherein the acidic metal salt curing agent is selected from the group consisting of chromic nitrate, chromic perchlorate, aluminum nitrate, aluminum chloride, and para-toluene sulfonic acid.

25. The method of claim 24 wherein the acidic metal salt curing agent is aluminum chloride.

26. A tape comprising a backing coated with a pressure sensitive adhesive wherein the pressure sensitive adhesive comprises an aqueous emulsion polymer, said polymer comprising the reaction product of at least one ethylenically unsaturated monomer and from about 0.1 to about 5 weight percent, based on the total weight of ethylenically unsaturated monomer, of a water-soluble or water-dispersible polymerizable surfactant having a terminal allyl amine moiety, wherein the polymerization is conducted at a pH of about 2 to about 7.

27. The tape according to claim 26 wherein the backing is selected from the group consisting of a nonwoven fabric, a woven fabric, a knit fabric, a paper or a foam.

28. A substrate comprising a pressure sensitive adhesive wherein the pressure sensitive adhesive comprises an aqueous emulsion polymer, said polymer comprising the reaction product of at least one ethylenically unsaturated monomer and from about 0.1 to about 5 weight percent, based on the total weight of ethylenically unsaturated monomer, of a water-soluble or water-dispersible polymerizable surfactant having a terminal allyl amine moiety, wherein the polymerization is conducted at a pH of about 2 to about 7.

* * * * *